(12) United States Patent
Ollila et al.

(10) Patent No.: US 8,644,699 B2
(45) Date of Patent: Feb. 4, 2014

(54) METHOD AND APPARATUS FOR LIGHT EMITTING DIODE CONTROL

(75) Inventors: Mikko Ollila, Tampere (FI); Tuomo Morsky, Lempaala (FI)

(73) Assignee: Nokia Corporation, Espoo (FI)

( * ) Notice: Subject to any disclaimer, the term of this patent is extended or adjusted under 35 U.S.C. 154(b) by 15 days.

(21) Appl. No.: 13/029,527

(22) Filed: Feb. 17, 2011

(65) Prior Publication Data

US 2012/0213504 A1  Aug. 23, 2012

(51) Int. Cl.
*G03B 7/26* (2006.01)

(52) U.S. Cl.
USPC .......................................................... 396/205

(58) Field of Classification Search
USPC .......................................... 396/161, 166, 205
See application file for complete search history.

(56) References Cited

U.S. PATENT DOCUMENTS

| | | | | |
|---|---|---|---|---|
| 6,616,291 B1* | 9/2003 | Love | ............................ | 362/101 |
| 8,214,084 B2* | 7/2012 | Ivey et al. | ..................... | 700/275 |
| 2001/0028227 A1* | 10/2001 | Lys et al. | ....................... | 315/317 |
| 2002/0122309 A1* | 9/2002 | Abdelhafez et al. | .......... | 362/294 |
| 2002/0130786 A1* | 9/2002 | Weindorf | ................. | 340/815.45 |
| 2007/0041185 A1* | 2/2007 | Yatsuda et al. | ................ | 362/231 |
| 2007/0132692 A1 | 6/2007 | Yang | | |
| 2007/0139316 A1 | 6/2007 | Hyatt | | |
| 2008/0061717 A1* | 3/2008 | Bogner et al. | ................. | 315/309 |
| 2008/0218148 A1* | 9/2008 | Robertson et al. | ............ | 323/349 |
| 2010/0244707 A1 | 9/2010 | Gaines et al. | | |
| 2011/0133223 A1* | 6/2011 | van de Ven et al. | ............ | 257/88 |
| 2012/0068600 A1* | 3/2012 | Hartmann et al. | .............. | 315/51 |

OTHER PUBLICATIONS

"NXP Fully-integrated LED controller extends reach to higher power domain", May 10, 2010, (http://www.electropages.com/2010/05/nxp-fully-integrated-led-controller-extends-reach-to-higher-power-domain/), 3 pages.

* cited by examiner

*Primary Examiner* — Rodney Fuller
(74) *Attorney, Agent, or Firm* — Locke Lord LLP (57) ABSTRACT

An apparatus has a light emitting diode module that has one or more light emitting diodes each with a light emitting circuitry. The apparatus further has a controller functionally connected with the one or more light emitting circuitries; a housing surrounding the controller and the one or more light emitting circuitries; and a pair of power supply connectors extending outside of the housing and functionally connected with the controller. The controller receives operating power from the pair of power supply connectors and uses the received operating power to control operation of the one or more light emitting circuitries.

18 Claims, 5 Drawing Sheets

METHOD AND APPARATUS FOR LIGHT EMITTING DIODE CONTROL

TECHNICAL FIELD

The present application relates generally to LIGHT EMITTING DIODE control.

BACKGROUND

Some mobile phones have a built-in camera and one or more light emitting diodes or LEDs for assisting the use of the camera. For instance, there may be provided a privacy LED for indicating that the camera is used, autofocus assist light, flash light and/or red-eye reduction light LEDs.

SUMMARY

Various aspects of examples of the invention are set out in the claims.

According to a first aspect of the present invention, there is provided an apparatus, comprising:
  a light emitting diode module comprising one or more light emitting diodes each comprising a light emitting circuitry;
  a controller functionally connected with the one or more light emitting circuitries;
  a housing surrounding the controller and the one or more light emitting circuitries; and
  a pair of power supply connectors extending outside of the housing and functionally connected with the controller;
  wherein the controller is configured to receive operating power from the pair of power supply connectors and to using the received operating power to control operation of the one or more light emitting circuitries.

The controller may be further configured to determine commands carried by the operating power; and to perform based on the determined commands the controlling of the operation of the one or more light emitting circuitries.

The commands may be carried by the operating power as alternations of one of the following options: voltage, current or both voltage and current.

The controller may further comprise a temperature sensor inside the housing and configured to provide the controller with signals.

The controller may be further configured to perform based on the signals the controlling of the operation of the one or more light emitting circuitries.

The controller may comprise two light emitting circuitries.

The controller may be further configured to allocate different currents to the light emitting circuitries.

The controller may be further configured to perform the allocating of the different currents to the light emitting circuitries by at least partially bypassing at least one of the light emitting circuitries.

The controller may be further configured to signal information through the operating power via the pair of power supply connectors by causing changes in resistance of the light emitting diode module.

The apparatus may further comprise an asymmetric electrostatic discharge protection circuitry configured to protect the apparatus against electrostatic discharges of a given polarity.

The controller may be further configured to control the one or more light emitting diodes to provide a video assist light for assisting shooting of video footage.

The controller may be further configured to control the one or more light emitting diodes to provide a light for assisting shooting of a still image. This light may operate e.g. as a flash light or as an auto-focus assist light.

The controller may further comprise a memory comprising calibration information for adaptation of the use of the one or more light emitting diodes.

According to a second aspect of the present invention, there is provided an apparatus comprising:
  a light emitting diode driver configured to produce on-demand supply voltage for one or more light emitting diodes and to produce commands for controlling of the one or more light emitting diodes;
  a command modulator configured to receive commands from the driver and to modulate the commands to the supply voltage; and
  an output configured to output the supply voltage and modulated commands to the one or more light emitting diodes via two connectors.

According to a third aspect of the present invention, there is provided an apparatus comprising:
  a camera unit;
  a light emitting diode module comprising one or more light emitting diodes each comprising a light emitting circuitry configured to assist the use of the camera unit;
  a controller functionally connected with the one or more light emitting circuitries;
  a housing surrounding the controller and the one or more light emitting circuitries; and
  a pair of power supply connectors extending outside of the housing and functionally connected with the controller;
  wherein the controller is configured to receive operating power from the pair of power supply connectors and to using the received operating power to control operation of the one or more light emitting circuitries.

The controller may be further configured to:
  determine commands carried by the operating power; and
  perform based on the determined commands the controlling of the operation of the one or more light emitting circuitries.

The apparatus may further comprise:
  a light emitting diode driver configured to produce on-demand supply voltage for the one or more light emitting diodes and to produce the commands for controlling of the one or more light emitting diodes;
  a command modulator configured to receive the commands from the driver and to modulate the commands to the supply voltage; and
  an output configured to output the supply voltage and modulated commands to the one or more light emitting diodes via two nodes functionally connected to the two connectors, respectively.

According to a fourth aspect of the present invention, there is provided a method comprising:
  emitting light by a light emitting diode module comprising one or more light emitting diodes each comprising a light emitting circuitry;
  wherein:
    a controller is functionally connected with the one or more light emitting circuitries;
    a housing is surrounding the controller and the one or more light emitting circuitries; and
    a pair of power supply connectors is extending outside of the housing and being functionally connected with the controller;

the method further comprising:
receiving by the controller operating power from the pair of power supply connectors and to using the received operating power to control operation of the one or more light emitting circuitries.

The controller may further determine commands carried by the operating power; and perform based on the determined commands the controlling of the operation of the one or more light emitting circuitries.

A temperature sensor inside the housing may provide the controller with signals.

The controller may further perform based on the signals the controlling of the operation of the one or more light emitting circuitries.

The controller may comprise two light emitting circuitries.

The controller may further allocate different currents to the light emitting circuitries.

The controller may further perform the allocating of the different currents to the light emitting circuitries by at least partially bypassing at least one of the light emitting circuitries.

The controller may further signal information through the operating power via the pair of power supply connectors by causing changes in resistance of the light emitting diode module.

An asymmetric electrostatic discharge protection circuitry may protect the apparatus against electrostatic discharges of a given polarity.

The controller may further control the one or more light emitting diodes to provide a video assist light for assisting shooting of video footage.

The controller may further control the one or more light emitting diodes to provide a light for assisting shooting of a still image.

The controller may further comprise a memory comprising calibration information for adaptation of the use of the one or more light emitting diodes.

According to a fifth aspect of the present invention, there is provided an apparatus comprising:
a light emitting diode module comprising one or more light emitting diode means each comprising light emitting circuitry means for emitting light;
controller means functionally connected with the one or more light emitting circuitry means;
housing means for surrounding the controller means and the one or more light emitting circuitry means; and
a pair of power supply connector means extending outside of the housing and functionally connected with the controller means;
wherein the controller means is configured to receive operating power from the pair of power supply connector means and to using the received operating power to control operation of the one or more light emitting circuitry means.

According to a sixth aspect of the present invention, there is provided an apparatus comprising:
means for producing on-demand supply voltage for one or more light emitting diodes and for producing commands for controlling of the one or more light emitting diodes;
means for receiving commands from the means for producing commands and means for modulating the commands to the supply voltage; and
means for outputting the supply voltage and modulated commands to the one or more light emitting diodes via two connectors.

According to a sixth aspect of the present invention, there is provided an apparatus comprising:
camera means;
a light emitting diode module comprising one or more light emitting diodes each comprising a light emitting circuitry configured to assist the use of the camera unit;
controller means functionally connected with the one or more light emitting circuitries;
housing means surrounding the controller means and the one or more light emitting circuitries; and
a pair of power supply connector means for extending outside of the housing and for functionally connecting with the controller;
wherein the controller is for receiving operating power from the pair of power supply connector means and for using the received operating power to control operation of the one or more light emitting circuitries.

Different non-binding example aspects and embodiments of the present invention have been illustrated in the foregoing. The above embodiments are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 to 9 of the drawings.

Figure 1:
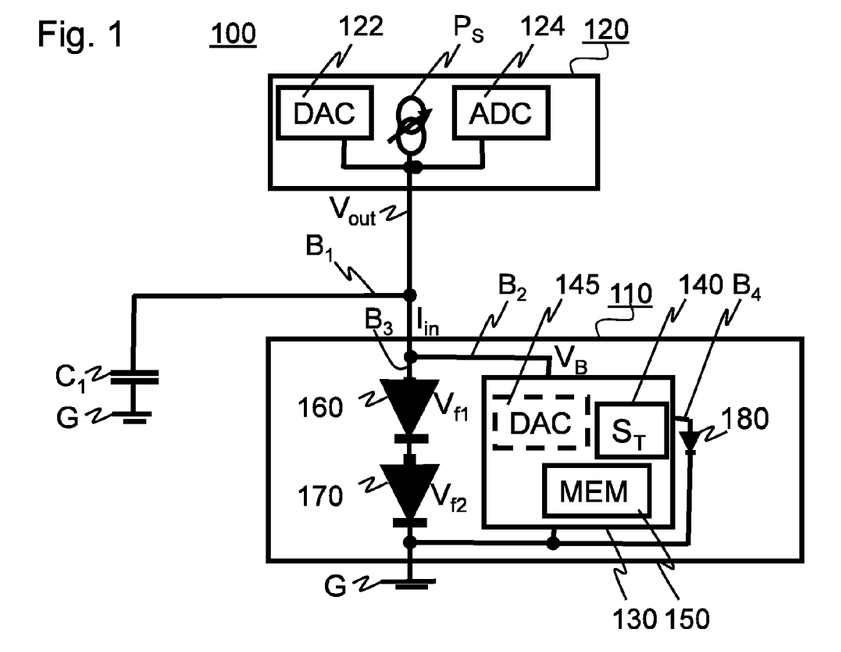
FIG. 1 is a block diagram of a system according to an example embodiment.

FIG. 1 is a block diagram of a system 100 according to an example embodiment. The system comprises a LED module 110 and a LED driver 120 that comprises a power supply $P_s$, and an digital-to-analog converter DAC 122 configured to produce commands that are carried along supply power (either in variations of voltage $V_{out}$ or in variations of current $I_{in}$)

that is produced by the power supply $P_s$, and an analog-to-digital converter ADC 124 for detecting fluctuations in the power supply caused by the LED module 110.

The power supply $P_s$ may be a constant current or voltage supply. In the description of the following examples, it is assumed that the power supply $P_s$ is a constant current power supply that is capable of varying output voltage so as to achieve a desired output voltage level. However, the DAC 122 may cause fluctuations to the output voltage or current of such a short duration that the power supply $P_s$ does not compensate for these fluctuations by responsively increasing or reducing its output power. It is also appreciated that while the described example presents a separate power supply $P_s$ and DAC 122, there are other implementations such as using a numerically controlled power supply the voltage and/or current of which can be defined individually for each subsequent moment as desired.

The supply voltage $V_{out}$ can be modified by the DAC 122 e.g. by causing very short periods during which the supply voltage or current is grounded to zero or reduced below the level needed for the LED module to produce light. There are various ways in which the control commands may be carried along with the supply power, see for two examples in FIGS. 6 and 7. A 1-wire technique is a well-known example.

The supply voltage $V_{out}$ is output to the LED module 110. In parallel with the LED module, along a first branch $B_1$, there is drawn a capacitance $C_1$ that is e.g. a parasitic capacitance caused by electric connectors.

The supply voltage $V_{out}$ of the LED module 110 is formed by a constant incoming current $I_{in}$ when the LED module is illuminating. This incoming current $I_{in}$ branches out to a second branch $B_2$ that leads to a first controller 130, and to a third branch B3 that leads to an anode of a first LED denoted as 160. The first LED 160 has a cathode that is connected to an anode of a second LED (170). The cathode of the second LED 170 is connected to ground G. The required forward voltage over the first LED 160 is denoted as $V_{f1}$ and the required forward voltage over the second LED 170 is denoted as $V_{f2}$ for illumination.

Figure 5:
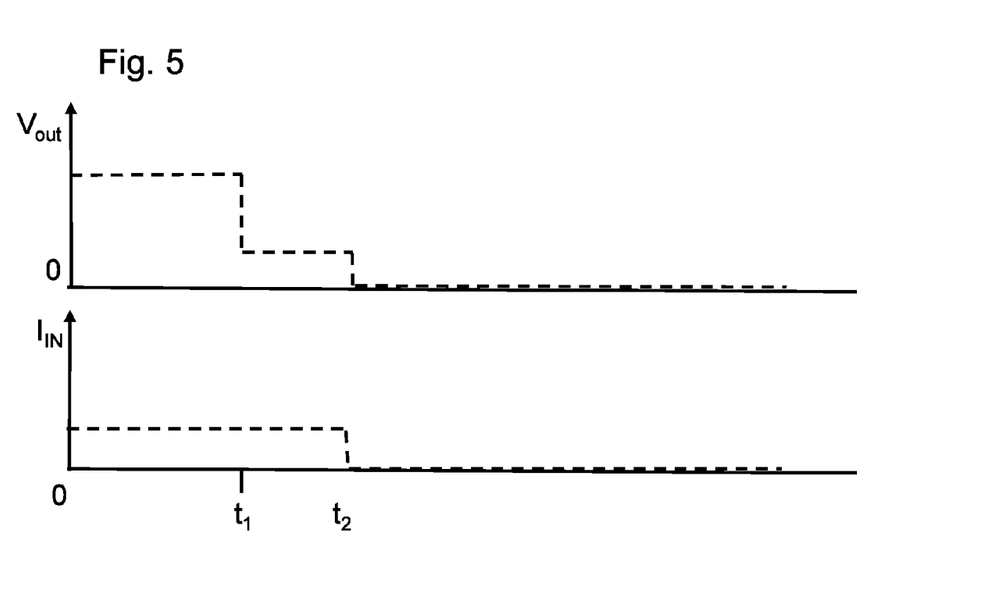
FIG. 5 shows a chart of supply voltage and current draw by the LED module as a function of time.

The LED module 110 may comprise, e.g. within the first controller 130, a temperature sensor 140 for protection of the LED module 110 against overheating (described with more detail with reference to FIG. 5).

The LED module 110 may comprise, e.g. within the first controller 130, a non-volatile memory 150 e.g. for storing calibration data corresponding to different operational parameters related to the LEDs and/or other components contained by the LED module 110.

The LED module 110 may also comprise a digital-to-analog converter 145 for sending information over the supply power to the LED driver 120. This digital-to-analog converter 145 can be used to send a wider variety of commands than just an abruption signal as indication of overtemperature situation that will be described in the following with reference to FIG. 5, for example. For instance, this digital-to-analog converter can be used to transmit to the LED driver 120 calibration information stored in the memory 150 and/or a temperature indication based on measurement of the temperature sensor 120.

The first controller 130 is further connected to an anode of a third LED 180. The cathodes of the third LED 180 and of the second 170.

Figure 9:
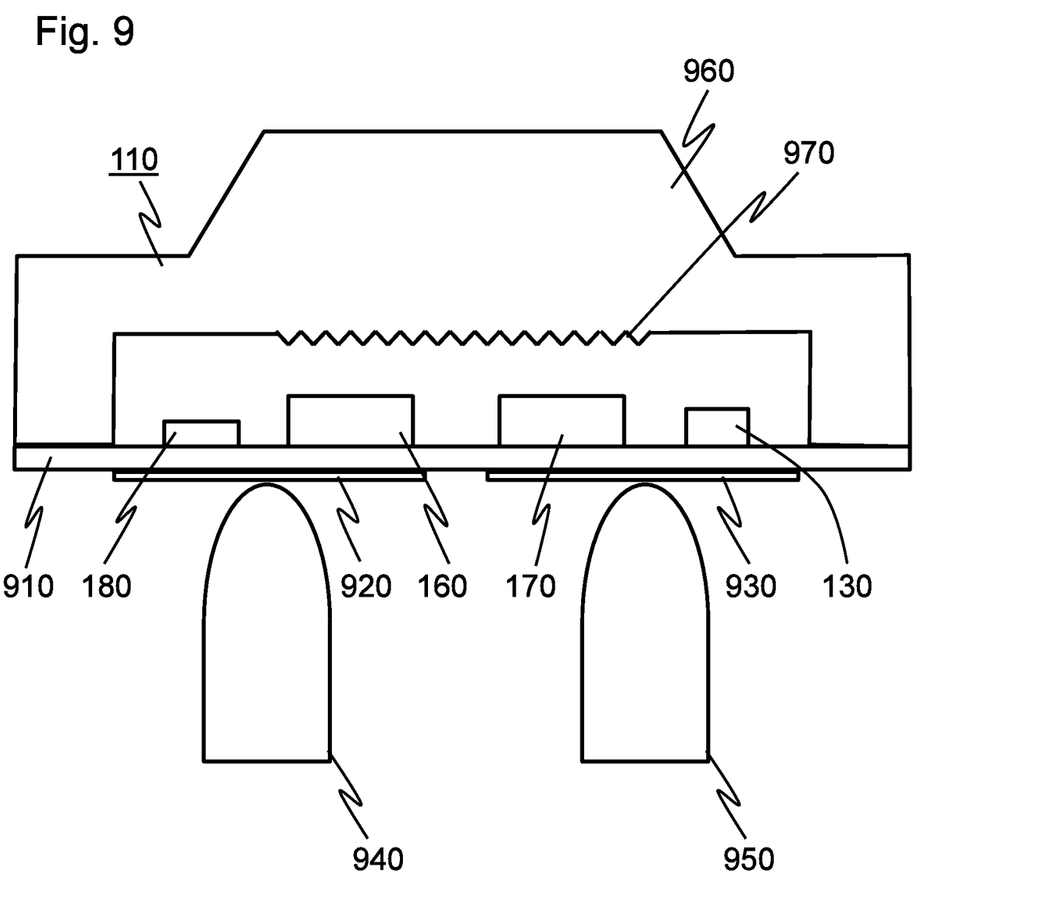
FIG. 9 shows a schematic cross-section drawing of a LED module and associated pogo connectors according to an example embodiment of the invention.

The LED module 110 has only two connectors, that is, one for ground or cathode and another for plus or anode. The LED module is, in one embodiment, formed into a single optically transparent housing such that the housing contains two or more light emitting circuitries or LED dice. It should be appreciated that in this description, unless stated to the contrary, the terms light emitting diode and its abbreviation LED are used for the light emitting circuitry alone without the usual transparent housing or lens. Instead, there is a common housing. FIG. 9 shows an example of a common housing. The LED module may be rather compact, e.g. 2 to 10, or 4 to 7 mm of diameter. The compactness together with plurality of heat emitting elements may cause a need for a heat conduit or other cooling, especially as the LED module may be so located in an apparatus that there is little heat dissipation or convection directly from the surfaces of the LED module. In an example embodiment, the two connectors are made of wide and/or thick so as to enhance heat convection to a circuit board.

Figure 2:
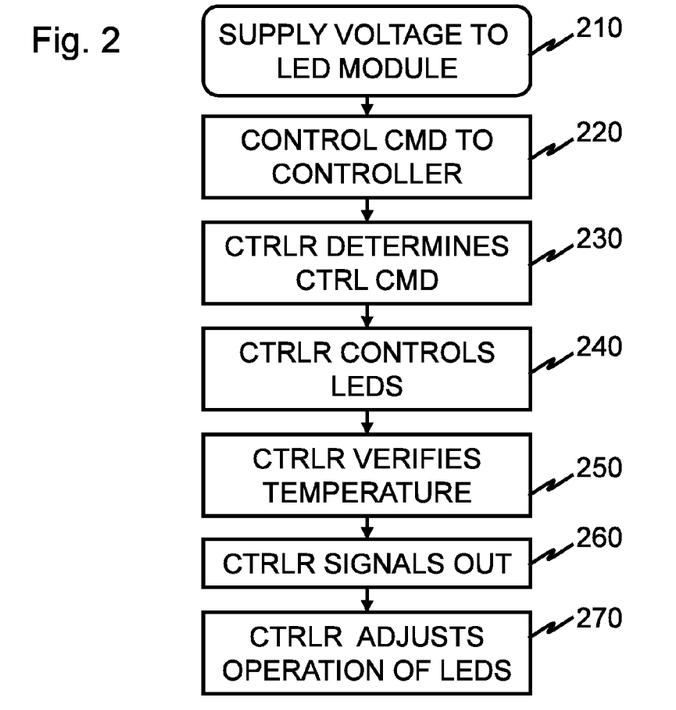
FIG. 2 shows a flow chart of a process that may be performed e.g. with the system shown in FIG. 1.

FIG. 2 shows a flow chart of a process that may be performed e.g. with the system 100 shown in FIG. 1. In step 210, the driver 120 produces an initial supply voltage $V_{out}$ for powering the LED module 110 and in particular for providing the first controller 130 with the supply voltage as an operating voltage.

In step 220, the LED driver 120 generates and sends with the supply voltage a control command to the first controller 130.

The first controller 130 receives the supply voltage as operating voltage determines 230 the control command carried by the operating voltage.

The first controller controls 240 the operation of the LEDs of the system 100. The controlling 240 of the operation of the LEDs may be based on the received control commands and/or on other criteria such as stored calibration parameters to direct power distribution through different LEDs of the system 100. The control of the operation of the LEDs of the system may involve, for instance, bypassing some of the LEDs and/or isolating one or more LEDs from the operating voltage. In FIG. 1, there is drawn a third LED 180 that is a privacy LED or a LED designed to indicate the use of a camera for shooting photographs or video images. The first controller 130 directs, when the third LED 180 is to light, current through the third LED 180 via the fourth branch $B_4$ to the anode of the third LED 180 and then to the ground G. On the other hand, if the third LED 180 should not be switched on, only the first and second LEDS 160 and 170 pass current and illuminate when the supply voltage is on. The controller 130 may also verify 250 the temperature in the LED module 110 based on the output of the temperature sensor 140. The controller may also send out signals 260 to the LED driver 120. Moreover, the controller 130 may adjust 270 the controlling 240 of the operation of the LEDs based on calibration information stored in the memory 150.

Figure 3:
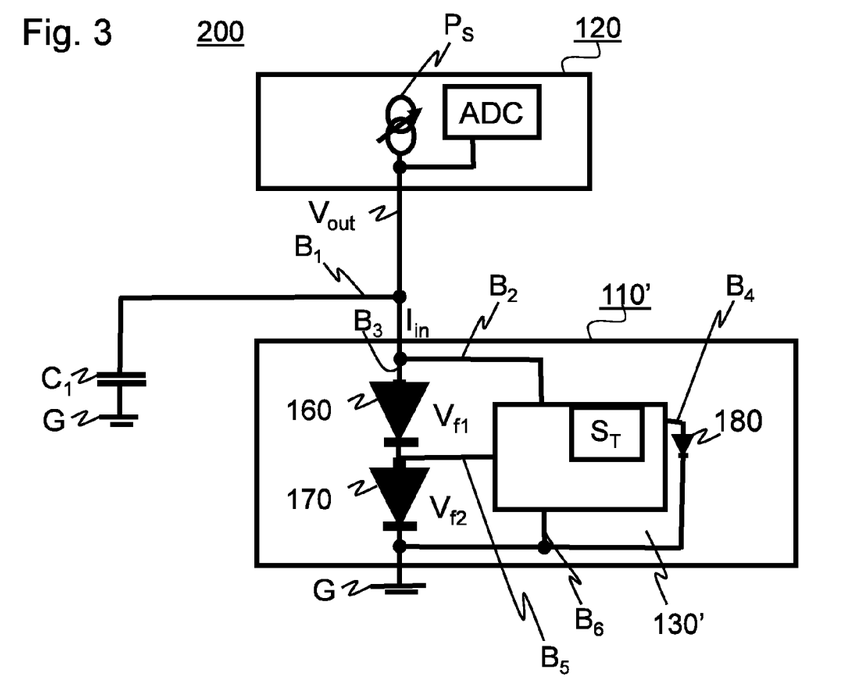
FIG. 3 is a block diagram of a system according to another example embodiment.

FIG. 3 is a block diagram of a system 100 according to another example embodiment. FIG. 3 differs from FIG. 1 in that in FIG. 3, there is an adapted, second controller 130' and a fifth branch $B_5$ that connects the second controller 130' to the cathode of the first LED 160 and to the anode of the second LED 170. Moreover, FIG. 3 shows a sixth branch $B_6$ that connects the second controller 130' to the ground G.

The second controller is configured able to bypass the first LED 160 by leading current through the second controller 130' and the fifth branch to the anode of the second LED 170 such that the first LED receives insufficient current to illuminate. Thus only the second LED 170 illuminates. The second controller 130' and/or the LED driver 120 may also adjust the current through the second LED 170 to a desired level. The second controller 130' may provide a parallel path to the ground through the sixth branch $B_6$ with such a resistance that the current through the second LED 170 is at a desired level.

The example embodiment shown in FIG. 3 may be used, for instance, to implement an autofocus light. In this application, the third LED 180 remains switched off by the second controller 130' while light is provided with the second LED 170 for assisting adjusting of focus of a camera. For providing a flash light, both the first and second LEDs (160,170) may be used by not bypassing the first LED 160. Meanwhile, the third LED 180 may be switched off. The third LED 180 may also be partly switched on with such a reduced current that the third LED 180 produces a desired colorization for the flash light.

Figure 4:
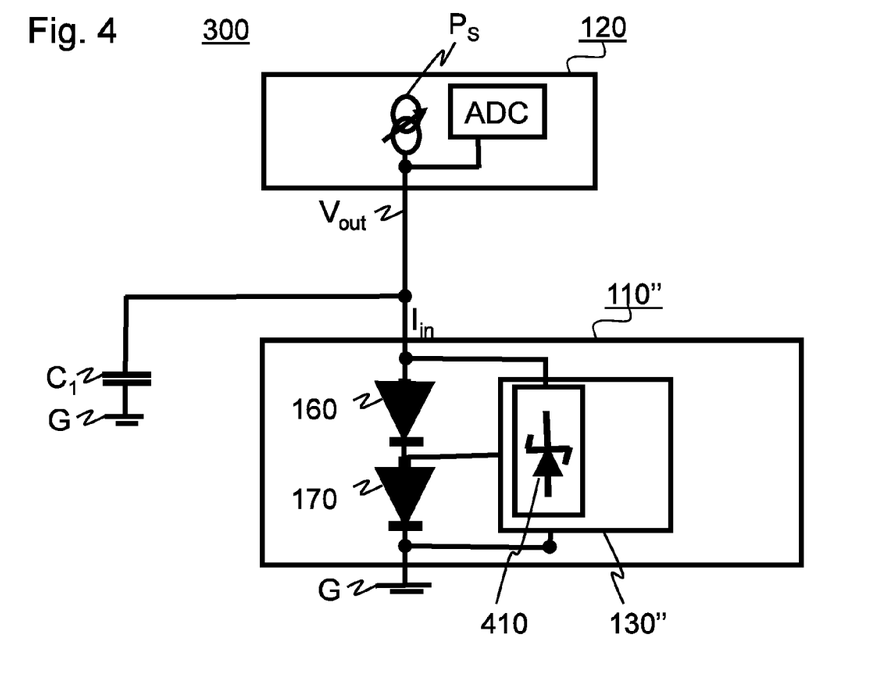
FIG. 4 is a block diagram of a system according to a still another example embodiment.

FIG. 4 is a block diagram of a system 100 according to a still another example embodiment. FIG. 4 differs from FIG. 3 in that there is not shown a temperature sensor and the third LED 180 of FIG. 3 is missing, and in that there is an electrostatic discharge protection component 410 such as a zener diode. The controller is thus denoted as a third controller 130". The two LEDs 160 and 170 are in this embodiment such LEDs that are not particularly susceptible to electrostatic discharges in a first direction. Thus, the electrostatic discharge protection component 410 may be one-directional and configured to protect against electrostatic discharges in a second direction that is opposite to the first direction The electrostatic discharge protection component 410 may be configured to provide sufficient protection against discharges of 8 kV.

The first and second LEDs 160 and 170 in FIG. 4 may be of common color, e.g. white. In an alternative example embodiment, the first and second LEDs are of different colors. For instance, the first LED 160 can be white while the second LED 170 can be red (e.g. for implementing a privacy LED and/or for coloring flash light). In this embodiment, to light only the first LED 160, the third controller 130" bypasses the second LED 170. On the other hand, if the first LED 160 should light brighter than the second LED 170, the third controller 130" bypasses entirely or in part the first LED 160.

In the preceding example embodiment as well as in some other embodiments there may be provided signalling i.e. indicating of given information to the LED driver 120 from a controller function. This indicating may be produced in one of many different ways, including but not limited to, one-wire signalling, causing voltage changes in the supply voltage by altering total resistance of the LED module 110" by the third controller.

FIG. 5 shows a chart of supply voltage and current draw by the LED module 110 as a function of time according to one example embodiment. Until a first moment of time, the LED driver 120 supplies a constant current $I_{in}$ that causes an output voltage $V_{out}$ such as 5 V to the LED module 110. The LED controller 130 then detects that the temperature is rising too high, based on the output of the temperature sensor 140, and responsively the controller 130 forms a low-resistance connection to ground G from the voltage input of the LED module 110. This results in a clear current change in the total resistance of the LED module 110. The LED driver 120 that maintains the incoming current $I_{in}$ as constant detects the drop in the output voltage $V_{out}$ and responsively cuts current supply to the LED module 110 which results in the output voltage $V_{out}$ also dropping to 0 V. In one further example embodiment, the controller does not maintain the voltage at lowered level but instead causes a pattern that comprises two or more momentary decreases in the output voltage $V_{out}$. The duration of such momentary decreases may be in the range of microseconds, say 2 to 5 microseconds.

The LED driver 120 may, after cutting off the supply voltage for protecting the LED module 110, attempt to use the LED module 110 again. If the temperature at the LED module 110 were still too high, the controller 130 would again signal the need to cut off the supply voltage. The controller 130 and/or the driver 120 may also contain a timer configured to cause a pause for letting the LED module 110 to cool down to a sufficient extent.

Figure 6:
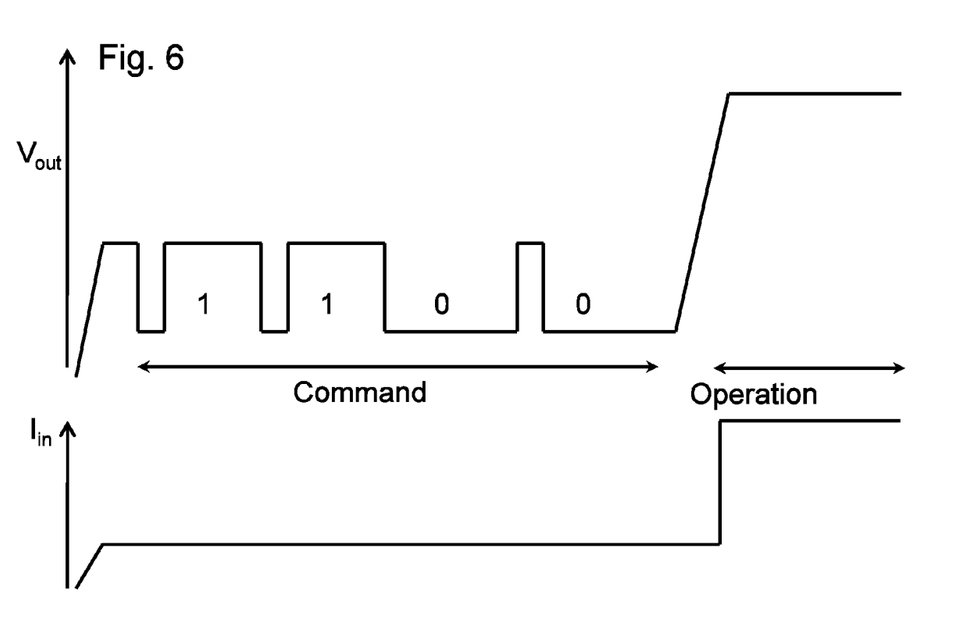
FIG. 6 shows a chart of supply voltage and current draw by a LED module as a function of time according to one example embodiment illustrating passing of a command from the a driver to a LED controller.

FIG. 6 shows a chart of supply voltage $V_{out}$ and current draw by the LED module 110 as a function of time according to one example embodiment illustrating passing of a command from the LED driver 120 to the LED controller 130. The power supply $P_s$ may alternate the voltage below the level at which the first and second LEDs 160,170 could operate (i.e. below $V_{f1}+V_{f2}$) while maintaining the current $I_{in}$ at a substantially constant level (e.g. by alternately opening and closing partial grounding so that resistance varies suitably to maintain constant current while voltage fluctuates). Thus, the LED controller 130 can obtain sufficient operating power to detect the command provided by the LED driver as a sequence of one or more changes in the operating power, here as changes in the current.

Figure 7:
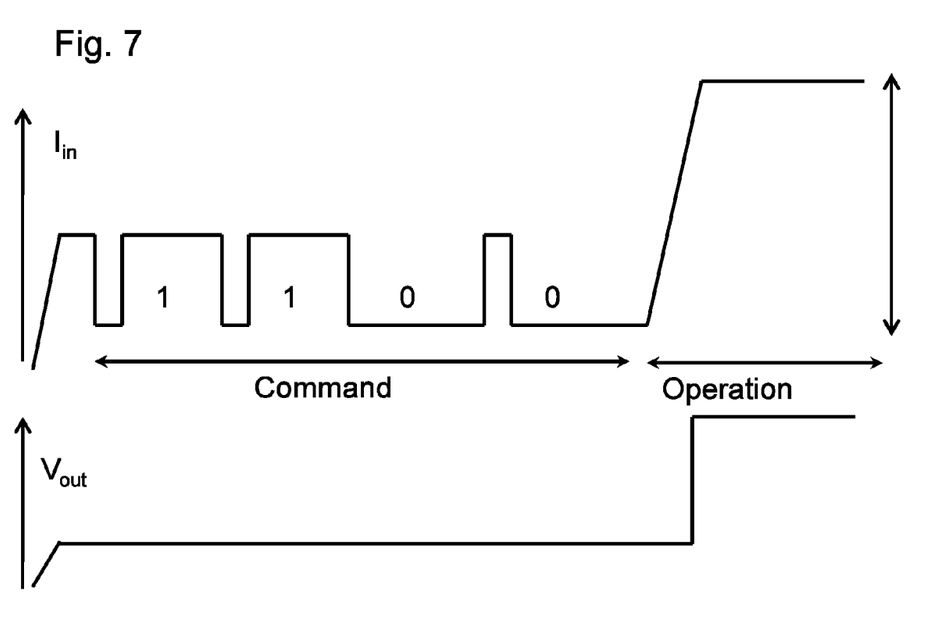
FIG. 7 shows supply voltage and current draw by the LED module as a function of time according to another example embodiment illustrating passing of a command from the LED driver to the LED controller.

FIG. 7 shows supply voltage $V_{out}$ and current draw by the LED module 110 as a function of time according to another example embodiment illustrating passing of a command from the LED driver 120 to the LED controller 130. In this embodiment, it is the current that is being alternated and the voltage is kept beyond the level at which the first and second LEDs 160, 170 could operate. For instance, the LED driver 120 may e.g. by alternately opening and closing partial grounding so that resistance varies suitably to maintain constant voltage while the current fluctuates.

It is also appreciated that the voltage and/or current during communication from the LED driver 120 to the LED controller 130 may be kept also that required for the operation of a single LED, especially when only one LED has been previously connected by the LED controller 130.

Figure 8:
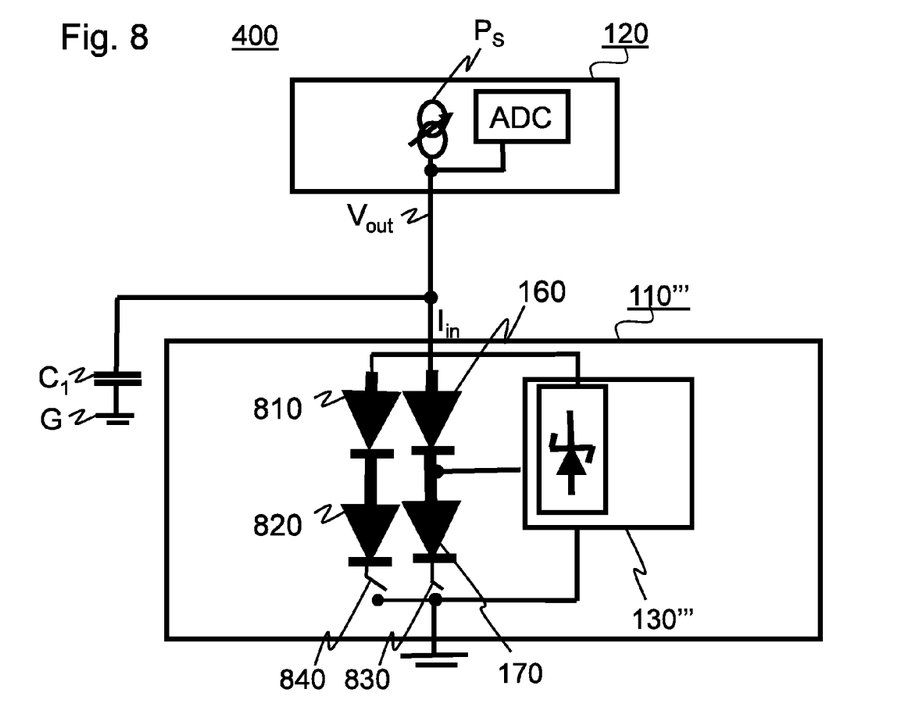
FIG. 8 is a block diagram of a system according to a still another example embodiment.

FIG. 8 is a block diagram of a system 100 according to a still another example embodiment. FIG. 8 differs from FIG. 4 in that there is drawn a group of four LEDs in two parallel series. The first and second LEDs form a series as in FIG. 4, but in parallel with these there is a series of a fourth and fifth LED (810, 820). In series with each of the two series of LEDs, there is a first controlled switch 830 and a second controlled switch 840, respectively. The control lines to the first and second switches are not shown in sake of clarity of the drawing. It is appreciated that alternatively the switches may be incorporated with a fourth controller 130'''.

In this embodiment, the controller, or more precisely the fourth controller 130''', controls which of the chains of LEDs is connected to pass current through to ground. Moreover, there is the fifth branch between the controller and the connection between the first and second LEDs (160 and 170) which enables the fourth controller to adjust the current that goes through the second LED 170. That is, the fourth controller 130''' may bypass some current from the junction of the first and second LEDs to ground with the result that the second LED 170 passes less current while the current through the first LED 160 increases. If the first and second LEDs have different spectrum, it is thus possible to adjust the current and power distribution between these LEDs in order to adjust the color of the light produced by the LED module 110'''. Moreover, in one embodiment, there is an interconnection between the junction of the fourth and fifth LEDs 810,820 and the junction of the first and second LEDs 160,170. In another embodiment, the junction of the fourth and fifth LEDs 810, 820 is connected to the fourth controller 130''' such that the fourth controller can adapt the current that flows through either or both of the fourth and fifth LEDs 810,820.

The different LEDs are implemented in any one of a variety of different ways. For example, two or more LEDs can be formed one or more dice. When two or more LEDs are formed on a single die and the die is thermally connected to the connectors of the LED module, heat may be efficiently dissipated. One or more of the LEDs may be Polymer light-emitting diodes (PLED), organic LEDs (OLEDs) or transparent OLEDs (TOLEDs).

FIG. 9 shows a schematic cross-section drawing of the LED module 110 and associated pogo connectors according to an example embodiment of the invention. The LED module 110 comprises three LEDs (160,170,180) as shown e.g. in FIG. 1 and the controller 130 mounted on a circuit board 910. The LED module 110 also comprises a plastic lens 960 that covers the LEDs. The plastic lens 960 may have a Fresnel element 970 for controlling light emitting pattern of the LED module 110. The circuit board 910 and the plastics lens 960 together form a housing for the LEDs, or more specifically, for the light emitting circuitries of the LEDs.

FIG. 9 further shows a first and second connector 920,930, which are located on the exterior side of the circuit board 910. Aligned with the first and second connectors 920,930 there are corresponding first and second connecting members 940, 950 such as pogo connectors or resiliently biased connecting members.

The connecting members are shown as relatively broad elements that function as efficient heat transfer conduits.

The aforedescribed LED driver and/or LED module may be used in a variety of different host devices, such as mobile phones, digital cameras, video cameras, camcorders, closed circuit cameras, personal digital assistants, game devices, navigators, radios, computers, watches, remote controllers, home appliances and optical storage devices.

Without in any way limiting the scope, interpretation, or application of the claims appearing below, a technical effect of one or more of the example embodiments disclosed herein is that a compact LED module may be created that can produce relatively large illumination power without overheating. Another technical effect of one or more of the example embodiments disclosed herein is that the illumination created by one or more LEDs is adjustable by a built-in controller. Another technical effect of one or more of the example embodiments disclosed herein is that the adjusting of the illumination may account for the internal temperature of the LED module without need for further pins or connectors. Another technical effect of one or more of the example embodiments disclosed herein is that current may be unequally distributed through different LEDs within the LED module without need for more than two connectors. Another technical effect of one or more of the example embodiments disclosed herein is that characteristics of the one or more LEDs within the LED module may be stored on manufacture of the LED module in a built-in memory and subsequently used to adapt the operation of the LED module accordingly. Another technical effect of one or more of the example embodiments disclosed herein is that the brightness produced by the LED module may be so varied that the LED module can be used as a video light that does not glare people near a camera that contains the LED module while the same LED module can also be used as a flash light that produces significantly higher illumination power for taking still shots. Another technical effect of one or more of the example embodiments disclosed herein is that the spectrum of light produced by the LED module can be adjusted. The adjustment can be performed to compensate for individual characteristics of LEDs in the LED module. Moreover or alternatively, the adjustment can be performed while using the LED module for producing of a flash light or video capturing assist light.

Embodiments of the present invention may be implemented in hardware on in combination with hardware and either or both of software and application logic.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
a light emitting diode module comprising a plurality of light emitting circuitries, wherein each of the plurality of light emitting circuitries is devoid of a transparent housing that individually covers each of the plurality of light emitting circuitries;
a controller functionally connected with the plurality of light emitting circuitries;
a common transparent housing collectively covering the controller and the plurality of light emitting circuitries, wherein the plurality of light emitting circuitries are collectively covered by only the common transparent housing and no other common transparent housing; and
a pair of power supply connectors extending outside of the housing and functionally connected with the controller;
wherein the controller is configured to receive operating power from the pair of power supply connectors; use the received operating power to power the plurality of light emitting circuitries under control of the controller; determine commands carried by the operating power; and perform, based on the determined commands, controlling of the operation of the plurality of light emitting circuitries.

2. The apparatus of claim 1, wherein:
the apparatus further comprises a temperature sensor inside the housing and configured to provide the controller with signals; and
the controller is further configured to perform based on the signals the controlling of the operation of the plurality of light emitting circuitries.

3. The apparatus of claim 1, wherein:
the apparatus comprises two light emitting circuitries; and
the controller is further configured to allocate different currents to the light emitting circuitries.

4. The apparatus of claim 3, wherein:
the controller is configured to perform the allocating of the different currents to the light emitting circuitries by at least partially bypassing at least one of the light emitting circuitries.

5. The apparatus of claim 1, wherein:
the controller is configured to signal information through the operating power via the pair of power supply connectors by causing changes in resistance of the light emitting diode module.

6. The apparatus of claim 1, wherein:
the apparatus comprises an asymmetric electrostatic discharge protection circuitry configured to protect the apparatus against electrostatic discharges of a given polarity.

7. The apparatus of claim 1, wherein:
the controller is further configured to control the plurality of light emitting circuitries to provide a video assist light for assisting shooting of video footage.

8. The apparatus of claim 1, wherein:
the controller is further configured to control the plurality of light emitting circuitries to provide a light for assisting shooting of a still image.

9. The apparatus of claim 1, wherein:
the controller further comprises a memory comprising calibration information for adaptation of the use of the plurality of light emitting circuitries.

10. An apparatus, comprising:
a camera unit;
  a light emitting diode module comprising a plurality of light emitting circuitries configured to assist the use of the camera unit, wherein each of the plurality of light emitting circuitries is devoid of a transparent housing that individually covers each of the plurality of light emitting circuitries;
  a controller functionally connected with the plurality of light emitting circuitries;
  a common transparent housing collectively covering the controller and the plurality of light emitting circuitries, wherein the plurality of light emitting circuitries are collectively covered by only the common transparent housing and no other common transparent housing; and
  a pair of power supply connectors extending outside of the housing and functionally connected with the controller;
  wherein the controller is configured: to receive operating power from the pair of power supply connectors; use the received operating power to power the plurality of light emitting circuitries under control of the controller; determine commands carried by the operating power; and perform, based on the determined commands, controlling of the operation of the plurality of light emitting circuitries.

11. A method comprising:
emitting light by a light emitting diode module comprising a plurality of light emitting circuitries, wherein each of the plurality of light emitting circuitries is devoid of a transparent housing that individually covers each of the plurality of light emitting circuitries; and
wherein:
  a controller is functionally connected with the plurality of light emitting circuitries;
  a common transparent housing collectively covering the controller and the plurality of light emitting circuitries, wherein the plurality of light emitting circuitries are collectively covered by only the common transparent housing and no other common transparent housing; and
  a pair of power supply connectors is extending outside of the housing and being functionally connected with the controller;
the method further comprising the controller:
  receiving operating power from the pair of power supply connectors; using the received operating power to power the plurality of light emitting circuitries under control of the controller; determining commands carried by the operating power; and performing, based on the determined commands, controlling of the operation of the plurality of light emitting circuitries.

12. The method of claim 11, wherein a temperature sensor inside the housing provides the controller with signals and the controller further performs the controlling of the operation of the plurality of light emitting circuitries based on the signals.

13. The method of claim 11, wherein the controller comprises two light emitting circuitries and the controller further allocates different currents to the light emitting circuitries.

14. The method of claim 11, wherein the controller further signals information through the operating power via the pair of power supply connectors by causing changes in resistance of the light emitting diode module.

15. The method of claim 11, further comprising protecting the apparatus with a protection circuitry against electrostatic discharges of a given polarity.

16. The method of claim 11, wherein the controller further controls the plurality of light emitting circuitries to provide a light for assisting shooting of a still image.

17. The method of claim 11, wherein the controller further comprises a memory comprising calibration information for adaptation of the use of the plurality of light emitting circuitries and the controller adapts the operation of the plurality of light emitting circuitries using the calibration information.

18. An apparatus comprising:
  a light emitting diode module comprising a plurality of light emitting circuitry means for emitting light, wherein each of the plurality of light emitting circuitry means is devoid of a transparent housing that individually covers each of the plurality of light emitting circuitry means;
  controller means functionally connected with the plurality of light emitting circuitry means;
  common transparent housing means for collectively covering the controller means and the plurality of light emitting circuitry means, wherein the plurality of light emitting circuitry means are collectively covered by only the common transparent housing means and no other common transparent housing; and
  a pair of power supply connector means extending outside of the housing and functionally connected with the controller means;
  wherein the controller means is configured to: receive operating power from the pair of power supply connector means; use the received operating power to power the plurality of light emitting circuitry means under control of the controller means; determine commands carried by the operating power; and perform, based on the determined commands, controlling of the operation of the plurality of light emitting circuitry means.

* * * * *